April 23, 1929.  C. S. BUSHNELL  1,710,654
TRAIN CONTROL
Filed Oct. 21, 1922
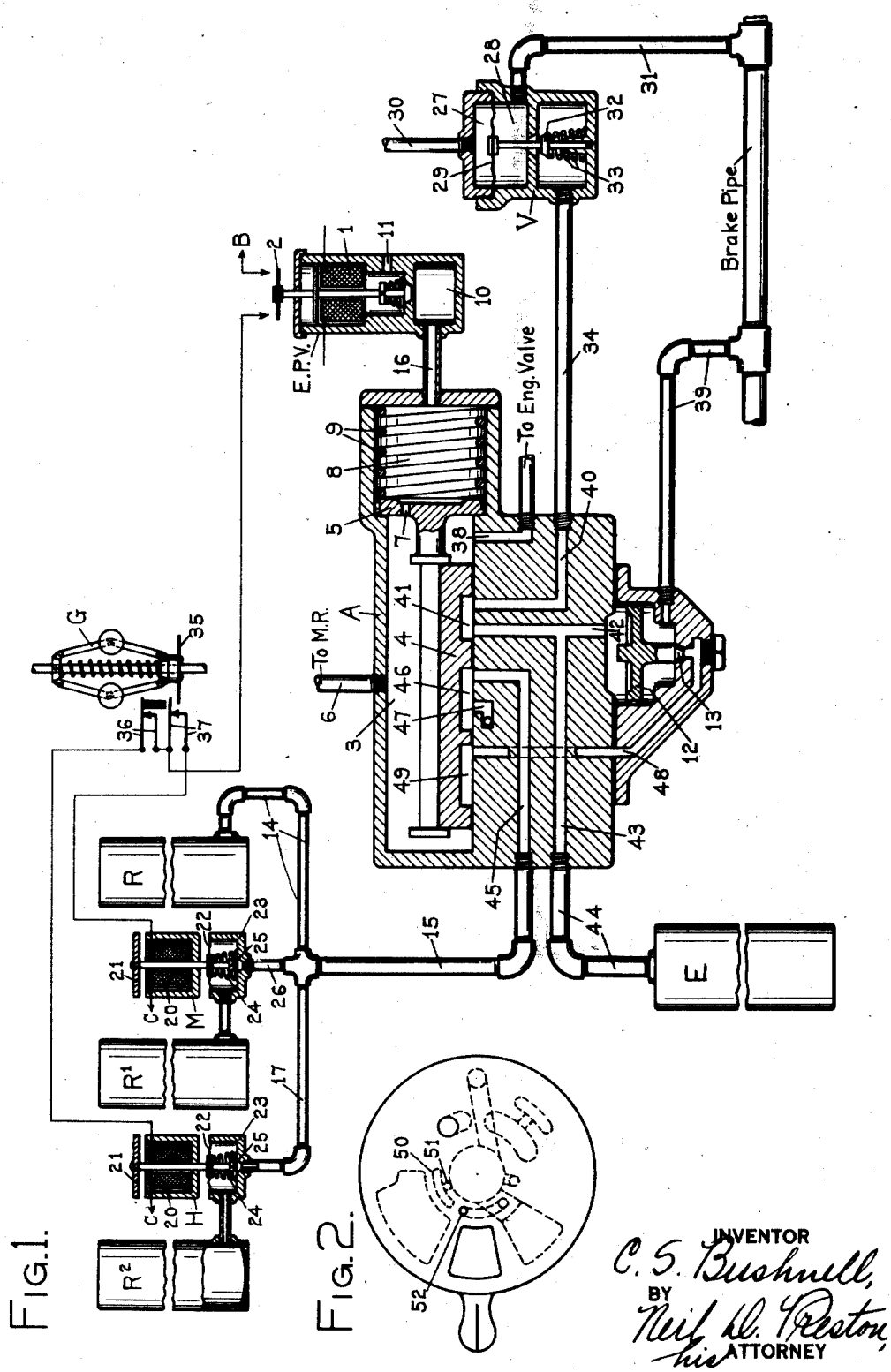

Patented Apr. 23, 1929.

1,710,654

UNITED STATES PATENT OFFICE.

CHARLES S. BUSHNELL, OF ROCHESTER, NEW YORK, ASSIGNOR TO GENERAL RAILWAY SIGNAL COMPANY, OF GATES, NEW YORK, A CORPORATION OF NEW YORK.

TRAIN CONTROL.

Application filed October 21, 1922. Serial No. 596,102.

This invention relates to automatic brake applying mechanisms adaptable for automatic train control systems.

In automatic train control systems, it becomes necessary to act upon the regular air-brake system now in common use and produce an automatic application of the brakes, preferably a service application, under certain conditions of traffic, speed of train, or the like. The particular conditions of traffic or speed under which the automatic brake application should occur, are not material to the present invention which deals particularly with the means for giving such an application effectively, efficiently, and in such a manner as not to endanger the train itself.

With the ordinary automatic air-brake system in common use upon railroads, a service brake application is given by venting the brake pipe at a limited rate. After the normal running brake pipe pressure has been reduced to a certain value, further reduction does not add to the braking effect, because the auxiliary reservoir pressure and brake cylinder pressure are equalized. Consequently, in making an automatic brake application, it is desirable to limit the amount of reduction in brake pipe pressure to an amount not to exceed that necessary for equalization, otherwise there is a useless waste of air which must be replaced before the brakes can be released.

The automatic brake application under consideration, should preferably be one which the engineer can not oppose or prevent. With the ordinary air-brake system, however, with the engineer's brake valve in released position or even the running position, the brake pipe may be kept up to pressure in spite of the venting thereof by the automatic mechanism. Hence, it is important in making the automatic brake application to also disconnect the engineer's brake valve from the main reservoir, so that the brake pipe pressure can positively be reduced irrespective of the position of the engineer's brake valve.

For various reasons, it is considered preferable, particularly for freight trains, to make the amount of reduction in brake pipe pressure dependent upon the speed of the train at the time the reduction is made. For one thing, a heavier brake application can be safely made on a freight train at higher speeds than at lower speeds.

Generally stated, the primary objects and purposes of this invention are to provide a simple and reliable brake applying mechanism which will make a predetermined reduction in brake pipe pressure from the normal running brake pipe pressure, and automatically cut off the connection from the main reservoir to the engineer's brake valve, and will make a reduction in brake pipe pressure to different degrees depending upon the speed of the train at which the automatic brake application occurs.

Other specific objects, characteristic features, and advantages of the invention will appear hereinafter as the description progresses. In the accompanying drawings, Fig. 1 shows in a simplified and diagrammatic manner the parts and circuits embodying this invention, these parts being shown more with the view of making it easy to understand the invention than with the idea of showing the precise construction preferably employed in practice; and Fig. 2 is a diagrammatic plan view of the rotary valve of the usual engineer's brake valve, showing the additional port and cavity added thereto for the purposes of this invention.

It is assumed that the brake applying mechanism shown in Fig. 1 will be controlled electrically in some suitable manner, dependent upon receiving a stopping influence from the trackway, the existing speed of the train, or other conditions, all of which forms no part of this invention. The primary control for the brake applying mechanism is exerted by an electro-pneumatic-valve EPV, the coil or winding 1 of which is connected to a suitable device and source of current which serves to deenergize this winding at the time and under the conditions it is desired to produce an automatic brake application. The stem of this electro-pneumatic-valve EPV is provided with an insulated contact disk 2 arranged to cooperate with stationary insulated contacts, shown conventionally by arrows, and close a circuit when the electro-pneumatic-valve EPV is deenergized.

The electro-pneumatic-valve EPV controls the operation of a pneumatically operated application valve designated as a whole A. This application valve A comprises a valve chamber 3 in which is a slide valve 4 shifted by a piston 5. The chamber 3 is in communication with the main reservoir by a pipe 6. Piston 5 has a small leakage hole 7 therein establishing communication between the valve chamber 3 and the cylindrical chamber 8 in which the piston 5 moves. A spring 9, strong enough to overcome the frictional opposition to the movement of piston 5 and the slide valve 4 tends to move said slide valve to the left as shown. The cylindrical portion 8 of the valve chamber is connected by pipe 16 to the small chamber 10 in the bottom of the electro-pneumatic-valve EPV. This chamber 10 is connected to atmosphere through a vent port 11 when the electro-pneumatic-valve EPV is deenergized. The slide valve 4 controls the connection between various ports and passages in the valve A, but these passages are more conveniently described in connection with the operation.

In the lower part of the application valve A or as a separate device if desired, is an equalizing piston 12 and valve 13, corresponding in structure and function to the equalizing piston and valve forming part of the usual engineer's brake valve.

In determining the amount of reduction in brake pipe pressure to be made, it is preferred to compare volumes by allowing a predetermined volume of air at the normal brake pipe pressure to escape from a special equalizing reservoir into a reduction chamber at atmospheric pressure. These reservoirs having a ratio of volumes corresponding to the amount of reduction desired, automatic venting of the brake pipe is arrested when the pressure therein has been reduced to that equal to the resultant pressure in the equalization chamber or reservoir and the reduction chamber or chambers. In Fig. 1, the equalizing chamber or reservoir is normally charged at brake pipe pressure, and is designated E. The reduction reservoir or chamber, is, in the particular embodiment shown, divided into three parts R, R¹, and R². The reduction chamber R is connected to the application valve A directly by pipes 14 and 15. The reduction chamber R¹ is connected to the application valve when an electro-pneumatic-valve M is deenergized; and similarly the reduction chamber R² is connected to the application valve when an electro-pneumatic-valve H is deenergized.

In the simplified construction shown, the electro-pneumatic-valves H and M each comprises an electro-magnet of the iron-clad type having a coil 20 and an armature and core 21. The core 21 is connected to a diaphragm 22 preferably of metal forming the upper part of a valve casing 23. This diaphragm is urged upward by a spring 24 and has fixed thereto a pin valve 25 adapted to control the flow of compressed air from the pipe 26, or the pipe 17, connected by pipe 15 to the application valve, to the expansion reservoirs R¹ and R².

Another element of the brake applying mechanism constituting this invention, is a pneumatically operated pin valve V. This valve V comprises upper and lower chambers 27 and 28 separated by a flexible diaphragm 29. The upper chamber 27 is in communication by pipe 30 to the pipe running in the usual locomotive air-brake equipment from the engineer's brake valve to the excess-pressure governor top of the pump governor. The lower chamber 28 is connected by pipe 31 to the brake pipe. Connected to the diaphragm 29 is a valve 32 raised by a spring 33 to its closed position, cutting off communication from the lower chamber 28 to pipe 34 leading to the application valve A.

Another element of the system is the suitable speed-responsive device or governor G, which is coupled to the wheels or axles or is driven in some other suitable way in accordance with the actual speed of the locomotive or other vehicle. This speed-responsive device G is shown in a simplified form in the drawings and acts in a well-known manner to raise an insulated collar or disk 35 to different positions dependent upon the actual speed; the higher the speed, the higher the position of the collar 35. Located in the path of movement of the collar 35 are two pairs of contact springs or fingers 36 and 37 which are arranged as shown so as to be opened when the speed-responsive device indicates the different speed limits. The speeds at which the respective pairs of contacts 36 and 37 open may be varied of course in practice to suit particular working conditions. For ordinary freight service, a typical organization is one in which both of the contacts 36 and 37 are closed below 20 miles per hour, the contacts 37 opening above 20 miles per hour, and contacts 36 opening above 27 miles per hour.

*Operation.*—The various parts are shown in Fig. 1 in the normal position, that is, the position while the train is running without a brake application and under conditions of speed or otherwise where it is unnecessary to produce an automatic brake application. The electro-pneumatic-valve EPV is energized and closed, preventing the escape of air to atmosphere from the right hand side of the piston 5. Main reservoir pressure, therefore, builds up through the leakage port 7 to the same pressure on opposite sides of the piston 5, which is then moved by spring 9 to the left-hand position shown. The engineer's brake valve will be in the running position, normal conditions being assumed; and with the brake valve in this running position, main reservoir pressure is supplied through ports in the engineer's valve to the pipe leading to the excess-pressure governor head, thereby supplying pressure through pipe 30 to upper chamber 27 against diaphragm 29 and opening valve 32. The high and medium speed valves H and M are deenergized and their respective valves 25 opened as shown. The pressure conditions, with the parts in the normal position, are as follows:—Main reservoir pressure is supplied from valve chamber 3 to port 38 to the engineer's brake valve, permitting the engineer to recharge and release in the usual way. Brake pipe pressure exists on the lower side of equalizing piston 12 by reason of pipe connection 39. Brake pipe pressure also is supplied through pipe 31, valve 32 which is opened, pipe 34, port 40, cavity 41 in slide valve 4, port 42 to the upper side of the equalizing piston 12. The port or passage 42 has an opening through passage 43, pipe 44, to the equalizing reservoir E, so that said reservoir is charged at the existing brake pipe pressure. The expansion reservoirs R, R$^1$ and R$^2$ are all connected to atmosphere through pipe 15, passage 45, cavity 46 in slide valve 4 and port 47 to atmosphere. The passage 48 from the underside of the equalizing piston valve 13 is blanked at cavity 49 of the slide valve 4.

Assume the parts in the normal condition described, and that on account of excess speed or otherwise, an automatic brake application is necessary. Further, assume that the engineer has not made any manual application. Upon deenergization of the electro-pneumatic valve EPV and the opening thereof, pressure on the righthand side of piston 5 is vented to atmosphere through exhaust port 11; and since this exhaust port 11 is much larger than the leakage port 7, pressure on the righthand side of piston 5 drops quickly, so that main reservoir pressure on the lefthand side of said piston forces it, together with its slide valve 4, over to the extreme righthand position in opposition to spring 9. This movement of the slide valve 4 blanks port 38, cutting off communication from the main reservoir to the engineer's brake valve, so that whether the engineer's brake valve is in the running, holding, or release positions, there is no feed to the brake pipe. This is necessary, as hereinbefore explained, in order to insure prompt and efficient venting of the brake pipe pressure to product an effective brake application. With the slide valve 4 shifted the equalizing reservoir E is connected to pipe 15 leading to the reduction reservoirs by cavity 46, the port 40 leading to the brake pipe being blanked. The passage 48, leading to the equalizing piston valve 13 is connected by cavity 49 to port 47, leading to atmosphere. Thus, existing brake pipe pressure is trapped, so to speak, in the equalizing reservoir E, this reservoir is thrown in communication with the expansion reservoir R, and the resultant pressure is applied to the upper face of the equalizing piston 12.

Assume that the speed is below, say 20 miles per hour, at the time of the automatic operation above described, so that contacts 36 and 37 are both closed. Upon deenergization of the electro-pneumatic-valve EPV, therefore, closure of its contacts 2 establishes an energizing circuit which can be readily traced on the drawing for the valves H and M, which being energized, close their respective valves 25, so that the expansion reservoir R alone is connected to pipe 15. It will be evident that the volume of the equalizing reservoir E with respect to the volume of the reduction reservoir R determines the resultant or equalization pressure of these reservoirs, and likewise the pressure on the upper face of the equalizing piston 12. As a typical illustration, assume that these volumes are so proportioned that their equalization pressure is 8 pounds lower than the former or initial pressure in the equalizing reservoir corresponding to the former or initial brake pipe pressure. The equalizing piston 12 raises and opens its valve 13 to vent the brake pipe through the pipe 39, valve 13 opened, passage 48, cavity 49, port 47 to atmosphere. This venting operation is similar to that which is produced by the equalizing piston of the usual engineer's brake valve. When the pressure in the brake pipe has been vented down to the point where it equals the equalization pressure of the reservoirs E and R, valve 13 closes and stops further venting; and if the reservoirs E and R are proportioned, as above stated, so that their equalization pressure is 8 pounds lower than the initial pressure in reservoir E, a brake pipe reduction of 8 pounds has been made automatically.

Assume next that the speed at the time of the automatic brake application is more than 20 miles per hour and less than 27 miles per hour, so that contacts 37 are opened while contacts 36 are closed. Magnet valve M is then deenergized, while magnet valve H is energized. The expansion reservoir R$^1$, as well as the reservoir R, is now connected to the equalizing reservoir E; and the combined volumes of reservoirs R and R$^1$ are proportioned to give the desired greater reduction for this speed, say 14 pounds. Similarly, if the speed at the time of the automatic application is more than 27 miles per hour, so that contacts 36 are opened as well as contact 37, all three expansion reservoirs R, R$^1$ and R$^2$ are thrown into communication with the equalizing reservoir E, so that the equalization pressure is still lower and gives a still greater brake pipe reduction, say 20 pounds, or full equalization. The pressure in the equalizing reservoir E at once drops and equalizes with that in reservoir R, or R plus R$^1$, or R, R$^1$ and R$^2$ together, as the case may be, so that subsequent reduction in speed, due to the automatic brake application, and the reclosing of contacts 36 or 37, energization of the valve magnets H or M, and closure of their valves 25, does not change the equalization pressure in the equalizing reservoir E. In other words, the amount of brake pipe reduction depends upon the instantaneous existing speed at the time the brake application is initiated and is not changed by any subsequent reduction in speed.

As soon as the speed has been properly reduced by the automatic brake application, or for other reasons it is considered appropriate to discontinue the automatic application, the electro-pneumatic-valve EPV is re-energized by apparatus (not shown) which is intended to be used to control this valve, as hereinbefore explained. This cuts off further escape of air to atmosphere from the right hand side of piston 5, and main reservoir pressure quickly builds up on both sides of said piston allowing it to be returned to the normal position shown by spring 9. The return of the slide valve 4 to normal opens the port 38, thereby re-establishing connection from the main reservoir to the engineer's brake valve and permitting the engineer to release the brakes. Cavity 46 connects the reduction reservoirs R, $R^1$ and $R^2$ to atmosphere. The cavity 41 connects the equalizing reservoir E to the brake pipe so that pressure in said reservoir at once builds up as the brake pipe is recharged and normal conditions resumed.

From the foregoing it will be observed that the automatic brake applying mechanism of this invention serves to make a predetermined limited reduction in brake pipe pressure, this reduction further varying dependent upon the speed existing when the brake application is initiated. If the speed is high, a large reduction and a heavy brake application are made. If the speed is medium, a lower reduction and a lighter brake application are made. If the speed is low, a still lighter brake application is made. This feature is considered to be of particular importance in connection with the braking of freight trains, in which, on account of the length of train and delay in the application and release of brakes on the several cars, the speed at which the brake application is made is an important factor in determining how heavy an application should be made. At low speeds, say under 12 miles per hour, an automatic application of the brakes on a long freight train is liable to produce serious damage; and it may be explained here that it is contemplated in accordance with this invention that the control of the electro-pneumatic-valve EPV is such that, at lower speeds, under 12 miles per hour, for example, this electro-pneumatic-valve EPV is never deenergized. Above the low critical speed given as 12 miles per hour, it is considered desirable to make the brake application dependent upon the speed, the higher the speed, the higher the permissible brake application.

While, according to specific embodiments shown, three degrees of brake application are disclosed, it will be obvious that the same principle may be extended by the same or equivalent means to provide any desired number of different degrees of brake application depending on speed.

Assume now that, for some reason, the brakes are partially or fully applied manually at the time the electro-pneumatic-valve EPV is deenergized to cause an automatic brake application. Obviously, if the brakes are already fully applied, it is unnecessary to further reduce the brake pipe pressure, since any reduction in brake pipe pressure after full equalization of the auxiliary reservoir and brake cylinder pressure does not add to the braking effort and is attended by the waste of air and other disadvantages. However, if the brakes are only partially applied and the speed of the train is such to warrant a heavier application, and such heavier application is demanded in the interests of safety, a further reduction in brake pipe pressure should be made. This desirable result is accomplished by this invention. Generally stated, at each automatic application, the normal running brake pipe pressure is automatically reduced, with due regard to any reduction that may have already been made, to a predetermined extent depending upon the existing speed. This is accomplished by the operation of the valve V which serves to trap, in the equalizing reservoir E, the normal running brake pipe pressure as soon as a manual reduction in brake pipe pressure is initiated, so that irrespective of the amount of brake pipe reduction made manually, there always remains in the equalizing reservoir E, as a standard of measurement, the normal running brake pipe pressure. As previously stated, the pipe 30 leading to the upper chamber 27 above the diaphragm 29 is connected to the pipe of the usual locomotive air-brake equipment which runs from the engineer's brake valve to the excess governor head. The function of this pipe and the pressures therein in the ordinary air-brake equipment are well-known. If the engineer's valve is in the release, running, or holding position, the pipe 30 is connected to main reservoir pressure. If, however, the engineer's valve is in the lap, service, or emergency positions, the pipe 30 is disconnected from main reservoir pressure. These pressure conditions exist in the ordinary equipment and correspond to those employed to control the so-called excess-pressure governor top or head. Under certain conditions, for example, if the pump is running, pressure may be trapped or left in the pipe 30 upon movement of the engineer's valve to a brake applying position; and to assure that the pipe 30 will always be exhausted whenever the engineer's valve is shifted from its feeding positions, an additional cavity and port are preferably added to the rotary valve of the engineer's brake valve, as shown in Fig. 2. This additional cavity 50 is connected by port 51 to the central exhaust passage of the engineer's brake valve; and this cavity 50 is arranged to connect the port 52 in the valve seat and leading to the excess-pressure governor head to atmosphere while the engineer's valve is in the lap, service and emergency positions. It may be stated here that this particular arrangement as shown and described, including the connection of pipe 30 to the pipe of the ordinary equipment leading to the excess-pressure governor head, has been adopted in order to take advantage as much as possible of existing equipment; and it will be apparent that other arrangements, such as a separate valve connected to the engineer's brake valve or additional ports in the engineer's valve may be employed to produce the desired operation of the valve V, that is, provide for pressure while the engineer's valve is in the release, running or holding positions and absence of pressure while in the lap, service or emergency positions.

Assume now that the engineer makes a manual application of the brakes prior to the operation of the mechanism to produce an automatic brake application. As soon as the engineer shifted his brake valve to the service or emergency position to make such manual brake application, pressure was cut off and exhausted from pipe 30, allowing spring 33 to close valve 32 and trap air at the former or normal running brake pipe pressure in the equalizing reservoir E. When, therefore, the electro-pneumatic-valve EPV is deenergized and the application valve A operates in the manner described, the standard pressure to which brake pipe will be automatically reduced is the same as if the engineer had made no previous manual application. In other words, the pressure upon the upper side of the equalizing piston valve 12 depends upon the equalization of pressure in reservoir E, combined with R, R$^1$ and R$^2$ as the case may be. Assuming that the speed is low, so that the resultant pressure in reservoir E is only 8 pounds lower than the normal running brake pipe pressure, it can be readily seen that, if the engineer has already made an 8 pound reduction in brake pipe pressure, the equalizing piston 12 does not shift, pressure on its underside being as low as or lower than that on the upper side. Consequently, if the engineer has made as great a reduction in brake pipe pressure as called for by the operation of the automatic mechanism, no further venting of the brake pipe occurs. Suppose, however, that the speed is high and that a 20 pound reduction is demanded by the automatic mechanism, and suppose that the engineer has made only, say, a 10 pound reduction manually. Then, the equalizing piston 12 is shifted to vent the brake pipe further until its pressure has been reduced to 20 pounds lower than its normal running pressure. In short, the automatic mechanism makes no further reduction in brake pipe pressure if the engineer has manually made a big enough reduction, but adds to whatever reduction the engineer has made until a sufficient reduction has been made to correspond with the existing speed.

It should be understood that the particular construction and arrangement of parts shown and described is merely illustrative of the invention and that these parts may be considerably modified without departing from the invention. I desire to have it understood, therefore, that the invention is not limited to the specific disclosure except as indicated in the appended claims.

What I claim is:—

1. Automatic means for venting the brake pipe of the usual air-brake system to a predetermined pressure to produce an automatic brake application comprising, an equalizing reservoir, and automatic means connecting said reservoir to the brake pipe while the engineer's valve is in the release, running or holding positions and for breaking such connection while the engineer's valve is in the lap, service or emergency positions.

2. In an automatic brake applying mechanism of the character described, the combination with the pipe of the usual air-brake system running from the engineer's brake valve to the excess-pressure governor top, automatic means for venting the brake pipe pressure to a predetermined value and including a reservoir, and means effective only while pressure exists in said pipe connected to the excess-pressure governor top for establishing a connection between said reservoir and the brake pipe.

3. Automatic brake applying mechanism of the character described, comprising, automatic means for venting the brake pipe to a predetermined pressure, means for determining said predetermined pressure to conform with the actual speed of the vehicle at the time, and means for rendering said predetermined pressure independent of any reduction in brake pipe pressure that may have been made by a manual operation of the engineer's brake valve prior to the operation of the automatic venting means.

4. In an automatic brake applying mechanism of the character described, the combination with automatic brake pipe venting means, of a valve controlling the connection between the brake pipe and said means, said valve being closed by a spring and opened only if the engineer's brake valve is in the release, running or holding positions.

5. In an automatic brake applying mechanism for air-brake systems, the combination with brake pipe venting means including a reservoir and adapted to produce a limited reduction in brake pipe pressure corresponding to a predetermined proportion of the pressure in said reservoir, of means normally connecting said reservoir to the brake pipe and operable upon movement of the engineer's brake valve to a brake applying position to disconnect said reservoir from the brake pipe.

6. In an automatic brake applying mechanism of the character described, means for maintaining a reservoir charged at normal brake pipe pressure irrespective of any reduction of pressure made by manual operation of the engineer's brake valve comprising, a valve biased to the closed position and opened by pressure, and means including ports and cavities of the engineer's brake valve for supplying pressure to said valve when the engineer's valve is in the release, running or holding positions and for exhausting such pressure when said engineer's valve is in the lap or a brake applying position.

7. Automatic brake applying apparatus for venting the brake pipe of the usual air brake system to a predetermined pressure to produce an automatic brake application of a predetermined extent comprising, a reservoir, automatic means connecting said reservoir to the brake pipe of the air brake system to charge said reservoir while the engineer's brake valve is in the release, running or holding position and for disconnecting said reservoir from the brake pipe while the engineer's brake valve is in the lap service or emergency position, and means for venting the brake pipe to an extent depending on the pressure to which said reservoir was charged.

8. Automatic brake applying apparatus for venting the brake pipe of the usual air brake system to a predetermined pressure to produce an automatic brake application of a predetermined extent comprising, a reservoir, automatic means for connecting said reservoir to the brake pipe while the engineer's brake valve is in the release, running or holding position and for disconnecting said reservoir from the brake pipe and trapping the pressure existing in said reservoir while the engineer's brake valve is in the lap position, and automatic means for venting the brake pipe to an extent depending on the pressure trapped in said reservoir.

9. Automatic brake applying apparatus for venting the brake pipe of the usual air brake system to a predetermined pressure to produce an automatic brake application of a predetermined extent comprising, a reservoir, the usual brake pipe, a valve controlling the communication of fluid pressure between said brake pipe and said reservoir, and automatic means for opening said valve while the engineer's brake valve is in the release, running or holding position and for closing said valve while the engineer's brake valve is in the lap position.

10. Brake applying apparatus for automatic train control systems superimposed on the usual automatic air brake system in which system a reduction in brake pipe pressure effects a brake application comprising, a reservoir normally connected to the brake pipe and charged to normal brake pipe pressure, and means for isolating said reservoir from the brake pipe when the usual engineer's brake valve is either in the lap or a brake applying position.

11. Brake applying apparatus for automatic train control systems superimposed on the usual automatic air brake system in which system a reduction in brake pipe pressure effects a brake application comprising, a reservoir normally connected to the brake pipe and charged to normal brake pipe pressure when the engineer's brake valve is in the running position, and means for isolating said reservoir from the brake pipe and trapping brake pipe pressure therein when the usual engineer's brake valve is moved to a brake applying position, said means functioning irrespective of whether or not such movement of the engineer's brake valve actually effects a reduction in brake pipe pressure.

12. Brake control apparatus for air brake system of the type in which the brake pipe is normally charged and in which venting of the brake pipe effects a brake application, an engineer's brake valve for controlling the brakes by venting and charging said brake pipe, and automatically operated brake applying mechanism including a pressure reservoir and a reduction reservoir and controlled by suitable train control mechanism for venting said brake pipe, said brake applying mechanism including means whereby the brake pipe is vented to a predetermined pressure below that of the brake pipe pressure existing before a brake application was started even though the brakes were partially manually applied.

13. In automatic apparatus for controlling an air brake system for train control purposes, the combination with the brake pipe and the engineer's brake valve of the air brake system, of a reservoir normally connected to the brake pipe, a valve controlling said connection between said reservoir and the brake pipe, said valve being biased to a closed position to interrupt such connection, and means for maintaining said valve open with the engineer's brake valve in the running position and for permitting said valve to close simultaneously upon movement of the engineer's valve to the lap, service or emergency positions and prior to and independently of any change in the brake pipe pressure resulting from such movement of the engineer's valve.

14. In an automatic train control system, the combination with an air brake system having a brake pipe and an engineer's brake valve, a reservoir normally connected to the brake pipe, and fluid pressure operated means including ports directly opened and closed by movement of the engineer's brake valve for cutting off said connection between said reservoir and the brake pipe while the engineer's brake valve is in the positions of lap, service, and emergency.

In testimony whereof I hereby affix my signature.

CHARLES S. BUSHNELL.